Patented Sept. 14, 1943

2,329,255

UNITED STATES PATENT OFFICE 2,329,255

CONCENTRATION OF ALIPHATIC ACIDS

Henry Dreyfus, London, and Walter Henry Groombridge, Spondon, near Derby, England, assignors to Celanese Corporation of America, a corporation of Delaware No Drawing. Application April 21, 1942, Serial No. 439,920. In Great Britain May 26, 1941

10 Claims. (Cl. 260—230)

This invention relates to the recovery of lower fatty acids, particularly acetic acid. It is especially concerned with the recovery of such acids, together with cellulose esters, from solutions of cellulose esters in the said acids; e. g. the recovery of cellulose acetate and acetic acid from solutions of cellulose acetate in acetic acid, for example the solutions obtained by the acetylation of cellulose with acetic anhydride in the presence of sulphuric acid. The invention will be described more particularly with reference to the treatment of such solutions.

A common method of isolating cellulose acetate and recovering acetic acid in concentrated form from solutions of cellulose acetate in acetic acid, is to precipitate the cellulose acetate by the action of an aqueous liquid and then, after separating the precipitated cellulose acetate, to extract acetic acid from the residual aqueous liquid by means of a solvent for acetic acid.

It has been found that in such processes the proportion of solvent for acetic acid which need be employed in relation to the amount of acid recovered can be reduced very greatly if the aqueous acid undergoing extraction contains a metal salt, preferably an alkali metal sulphate (which expression is used to include an alkali metal bisulphate), and if the extraction of the acetic acid is discontinued when a substantial proportion thereof still remains in the aqueous liquid.

According to the present invention cellulose acetate is precipitated from a solution thereof in acetic acid by the action of an aqueous solution of a metal salt containing some acetic acid; and, after separating the precipitated cellulose acetate, a part only of the acetic acid is extracted from the aqueous liquid by the action of a solvent for acetic acid, at least part of the residual aqueous liquid being then used for the precipitation of further cellulose acetate from an acetic acid solution thereof.

The extraction of a part only of the acetic acid content of the aqueous liquid, combined with the presence of the metal salt, enables the acetic acid of the cellulose acetate solution to be recovered by extraction with a proportion of solvent which is very much less than is the case when these expedients are not employed. At the same time at least part of the metal salt content of the liquid, after extraction of acetic acid from the latter, is utilised in a succeeding operation without expensive operations such as concentration of the metal salt or isolation of the said salt in solid form.

As indicated above, it is preferred that the metal salt used should be an alkali metal sulphate and the invention will now be described more particularly with reference to the procedure which can be adopted when such a salt is used.

The alkali metal sulphate should be present in substantial proportion, e. g. to the extent of from 3 to 10% or more based on the water present. It is preferred to use an amount of alkali metal sulphate sufficient to saturate the aqueous acetic acid.

As regards the extraction of acetic acid from the aqueous liquid containing acetic acid and alkali metal sulphate, this can be carried out so as to leave in the liquid from 10 to 45% of the acid present before extraction.

As indicated above, the new process is of especial value for the isolation of cellulose acetate from acetylation solutions obtained by acetylating cellulose with acetic anhydride in acetic acid in presence of sulphuric acid. When applying the process to such solutions (which may have been "ripened") the sulphuric acid content is converted to alkali metal sulphate by neutralisation (or partial neutralisation when a bisulphate is to be used) with, for example an alkali metal hydroxide, carbonate or acetate which can be added directly to the cellulose acetate solution or included in the precipitation liquid. By using alkali metal hydroxide, carbonate or acetate for neutralisation of the sulphuric acid the formation can be avoided of salts other than alkali metal sulphate, or of acids other than acetic acid, in the liquid to be extracted or that to be used for precipitation of cellulose acetate.

When cellulose acetate solutions containing sulphuric acid are treated as described above the quantity of alkali metal sulphate present will increase with each cycle of operations, unless a suitable proportion is removed from time to time and preferably at each cycle. This can be done by effecting substantially complete extraction of the acetic acid from a portion of the dilute acid containing the amount of the salt which it is desired to remove. The completely extracted liquor can then be run to waste after solvent recovery. An alternative procedure is to allow some of the salt to crystallise out, preferably by cooling, and remove it by filtration. Again, it is possible to regenerate alkali metal hydroxide or acetate in the liquors and at the same time remove part or all of the accumulation of sulphate ion by treating the liquors, after partial or complete extraction, with an oxide, hydroxide or acetate of a metal which forms an insoluble sulphate e. g. with calcium acetate. The precipitated sulphate can then be removed and the regenerated alkali metal hydroxide or acetate is available for combining with the sulphuric acid of a cellulose acetate solution containing this acid, as described above. The first mentioned procedure is, however, preferred in that it affords an opportunity of removing water from the cycle and thus compensating for fresh water introduced into the cycle for washing and/or precipitation of the cellulose acetate. In the case where complete extraction of a part of the waste liquor is practised, this is advantageously performed with fresh solvent, which is then passed on and utilised for partial extraction of the bulk of the aqueous acid. The part subjected to complete extraction can be a portion of the partially extracted liquor so obtained.

The alkali metal sulphate solution from which part only of the acetic acid has been extracted is advantageously used to wash precipitated cellulose acetate. This washing of the cellulose acetate is conveniently effected in counter-current, that is to say the alkali metal sulphate solution is used to wash successive portions of cellulose acetate of progressively increasing acetic acid content. The acetic acid content of the alkali metal sulphate solution is thereby increased and it is thereafter used to precipitate cellulose acetate from solution. The precipitated cellulose acetate after the washing with the alkali metal sulphate solution is washed with water, the washings being mixed with the alkali metal sulphate solution before the latter is used for washing cellulose acetate as mentioned above. Some water is thereby introduced at each cycle of operations and can be arranged to compensate for that removed, as described above, in the form of completely extracted alkali metal sulphate solution.

When counter-current washing of the precipitated cellulose acetate and final washing with water is practised the partially extracted dilute acid is conveniently mixed with the washing liquors resulting from the washing with water at a stage where the concentration of acetic acid in said washing liquors approximates to that of the dilute acid.

Various solvents may be used for the extraction. They should preferably be such as do not dissolve in, or take up water from, aqueous alkali metal sulphate solutions to a very substantial extent. Their boiling points may be above or below that of the acetic acid to be extracted. Further, their boiling points should preferably differ from that of the acetic acid by so much that they can be readily separated from the acid by a distillation operation. They may consist of single chemical compounds or mixtures of compounds.

Examples of solvents suitable for the extraction of acetic acid and having a boiling point below that of acetic acid are diethyl ether, dipropyl ether, di-isopropyl ether, ethyl acetate and similar volatile esters of acetic acid, methylene chloride and ethylene chloride. Particular mention may be made of the mixtures of solvents for acetic acid with hydrocarbons, mentioned in U. S. Patent No. 1,696,432. A suitable mixture is that of diethyl ether with petroleum ether or ethyl acetate with benzene, e. g. a mixture of 4–5 parts by volume of ethyl acetate with 6–5 parts by volume of benzene.

An example of a suitable solvent having a boiling point above that of acetic acid is amyl acetate.

When acid sulphates, for example, sodium bisulphate, are present in the aqueous acetic acid, the use of solvents containing esters, e. g. ethyl acetate, is undesirable owing to the danger of hydrolysis. In such a case, it is convenient to use as solvent an ether.

The extraction with the solvent is advantageously effected systematically, a given body of solvent being used to extract successively a series of acid solutions of progressively increasing concentration. Batch methods may be used, extraction being then conveniently effected in a series of vessels and the extract and extracted liquor being transferred from vessel to vessel, the extract for extraction of further acid of higher concentration than that just extracted, and the extracted liquor for extraction by solvent containing a smaller proportion of acid than that just used for extraction.

Again, continuous counterflow extraction may be used, the solvent being run in counter-current to the aqueous liquor. The apparatus may then conveniently take the form of a column, through which the aqueous acid and solvent are passed in counterflow, whichever has the lower specific gravity being introduced at the lower part of the column. The liquids are advantageously introduced into the column in a series of fine streams so as to provide a large surface of contact between the liquids. Further the column may be provided with suitable packing material to the same end.

Isolation of concentrated acid from the extract can be effected by distillation. The extract can be distilled in batches or continuous stills can be used. The recovered solvent can of course be returned to the extraction apparatus. When the solvents used as extractants form with water azeotropic mixtures of minimum boiling point, water extracted with the acid to be concentrated can be removed to a substantial degree during the distillation, in the form of such a mixture, together with the solvent, thereby facilitating the production of a highly concentrated or even substantially anhydrous acid.

The process of the invention can also be applied to the isolation of cellulose esters from solutions generally in lower fatty acids, particularly solutions which have been prepared by esterification of cellulose in presence of a lower fatty acid, for example, a solution of cellulose propionate in propionic acid.

Further in place of an alkali metal sulphate other sulphates soluble in aqueous acetic acid can be used, e. g. magnesium or zinc sulphate.

Again where an acid other than sulphuric acid is used as the esterification catalyst, a salt corresponding to this acid can be used instead of a sulphate in the process of the invention, e. g. when phosphoric acid is the esterification catalyst a suitable salt is sodium phosphate. The phosphate can be formed in situ as in the case of the sulphate, by adding a hydroxide, carbonate or lower fatty acid salt, corresponding to the lower fatty acid in the esterification mixture, to the cellulose ester solution or the precipitation liquid in order to combine with the phosphoric acid.

Having described our invention what we desire to secure by Letters Patent is:

1. Process for the recovery of cellulose acetate and acetic acid from a solution of cellulose acetate in acetic acid, which comprises precipitating the cellulose acetate from the solution by the action of an aqueous solution of a metal salt containing some acetic acid, the metal salt amounting to at least 3% based on the water present, separating the precipitated cellulose acetate, extracting part only of the acetic acid from the aqueous liquid by the action of a solvent for acetic acid, and using at least part of the residual aqueous liquid for the precipitation of further cellulose acetate from an acetic acid solution thereof.

2. Process for the recovery of a cellulose ester of a lower fatty acid and a lower fatty acid from a solution of the cellulose ester in the acid, which comprises precipitating the cellulose ester from the solution by the action of an aqueous solution of a metal salt containing some of the lower fatty acid, the metal salt amounting to at least 3% based on the water present, separating the precipitated cellulose ester, extracting part only of the lower fatty acid from the aqueous liquid by the action of a solvent for the lower fatty acid and using at least part of the residual aqueous liquid for the precipitation of further cellulose ester from a lower fatty acid solution thereof.

3. Process for the recovery of cellulose acetate and acetic acid from a solution of cellulose acetate in acetic acid, which comprises precipitating the cellulose acetate from the solution by the action of an aqueous solution of a metal sulphate containing some acetic acid, the metal sulphate amounting to at least 3% based on the water present, separating the precipitated cellulose acetate, extracting part only of the acetic acid from the aqueous liquid by the action of a solvent for acetic acid, and using at least part of the residual aqueous liquid for the precipitation of further cellulose acetate from an acetic acid solution thereof.

4. Process for the recovery of cellulose acetate and acetic acid from a solution of cellulose acetate in acetic acid, which comprises precipitating the cellulose acetate from the solution by the action of an aqueous solution of an alkali metal sulphate containing some acetic acid, the alkali metal sulphate amounting to at least 3% based on the water present, separating the precipitated cellulose acetate, extracting part only of the acetic acid from the aqueous liquid by the action of a solvent for acetic acid, and using at least part of the residual aqueous liquid for the precipitation of further cellulose acetate from an acetic acid solution thereof.

5. Process for the recovery of a lower fatty acid and a cellulose ester of a lower fatty acid from an esterification solution of the said ester made by esterification of cellulose with a lower fatty acid anhydride in a lower fatty acid using sulphuric acid as catalyst, which comprises converting the sulphuric acid to a metal sulphate, precipitating the cellulose ester from the solution by the action of an aqueous solution of the metal sulphate containing some of the lower fatty acid so that the resulting aqueous liquid contains at least 3% of the metal sulphate based on the water present, separating the precipitated ester, extracting a part only of the lower fatty acid from the aqueous liquid by the action of a solvent therefor, removing the solvent from the extract and using the residual aqueous liquid as at least part of an aqueous liquid for the precipitation of further cellulose ester from a solution thereof in the lower fatty acid.

6. Process for the recovery of cellulose acetate and acetic acid from an acetylation solution made by acetylating cellulose with acetic anhydride in acetic acid using sulphuric acid as catalyst, which comprises converting the sulphuric acid into sodium sulphate, precipitating the cellulose acetate from the solution by the action of an aqueous solution of sodium sulphate containing some acetic acid so that the resulting aqueous liquid contains at least 3% of sodium sulphate based on the water present, separating the precipitated cellulose acetate, extracting a part only of the acetic acid from the aqueous liquid by the action of a solvent for the acetic acid, removing the solvent from the extract and using the residual aqueous liquid as at least part of an aqueous liquid for the precipitation of further cellulose acetate from an acetic acid solution thereof.

7. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of sodium sulphate containing some acetic acid and sufficient sodium acetate to convert the sulphuric acid into sodium sulphate so that the aqueous liquid contains at least 3% of sodium sulphate based on the water present, separating the precipitated cellulose acetate, extracting a part only of the acetic acid from the aqueous liquid by the action of a solvent for the acetic acid, removing the solvent from the extract and using the residual aqueous liquid as at least part of an aqueous liquid for the precipitation of further cellulose acetate from an acetic acid solution thereof.

8. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of sodium sulphate containing some acetic acid and sufficient sodium acetate to convert the sulphuric acid into sodium sulphate so that the resultant aqueous liquid is substantially saturated with sodium sulphate, separating the precipitated cellulose acetate, extracting a part only of the acetic acid from the aqueous liquid by the action of a solvent for the acetic acid, removing the solvent from the extract and using the residual aqueous liquid as at least part of an aqueous liquid for the precipitation of further cellulose acetate from an acetic acid solution thereof.

9. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of sodium sulphate containing some acetic acid and sufficient sodium acetate to convert the sulphuric acid into sodium sulphate so that the resultant aqueous liquid is substantially saturated with sodium sulphate, separating the precipitated cellulose acetate, extracting from 55 to 90% of the acetic acid from the aqueous liquid by the action of a solvent for the acetic acid, removing the solvent from the extract and using the residual aqueous liquid as at least part of an aqueous liquid for the precipitation of further cellulose acetate from an acetic acid solution thereof.

10. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of sodium sulphate containing some acetic acid and sufficient sodium acetate to convert the sulphuric acid into sodium sulphate so that the resultant aqueous liquid is substantially saturated with sodium sulphate, separating the precipitated cellulose acetate, extracting from 55 to 90% of the acetic acid from the aqueous liquid by the action of a mixture of benzene and ethyl acetate, removing the benzene and ethyl acetate from the extract and using the residual aqueous liquid for the precipitation of further cellulose acetate from an acetic acid solution thereof.

HENRY DREYFUS.
WALTER HENRY GROOMBRIDGE.